United States Patent
Simoneau et al.

(10) Patent No.: US 10,934,402 B2
(45) Date of Patent: Mar. 2, 2021

(54) URETHANE UREA ACRYLIC CAST SHEET MATERIALS

(71) Applicant: Spartech, LLC, St. Louis, MO (US)

(72) Inventors: Christopher A. Simoneau, Oxford, CT (US); Carlos B. Guerra, Fairfield, CT (US)

(73) Assignee: SPARTECH, LLC, St. Louis, MO (US)

(*) Notice: Subject to any disclaimer, the term of this patent is extended or adjusted under 35 U.S.C. 154(b) by 67 days.

(21) Appl. No.: 15/818,898

(22) Filed: Nov. 21, 2017

(65) Prior Publication Data

US 2018/0142072 A1    May 24, 2018

Related U.S. Application Data

(60) Provisional application No. 62/425,901, filed on Nov. 23, 2016.

(51) Int. Cl.

| | | |
|---|---|---|
| *C08F 290/06* | (2006.01) | |
| *C08J 5/18* | (2006.01) | |
| *C08G 18/10* | (2006.01) | |
| *C08G 18/38* | (2006.01) | |
| *C08G 18/67* | (2006.01) | |
| *B29C 39/02* | (2006.01) | |
| *B29C 67/24* | (2006.01) | |
| *B29C 39/00* | (2006.01) | |
| *C08G 18/24* | (2006.01) | |
| *C08G 18/81* | (2006.01) | |
| *C08F 283/00* | (2006.01) | |
| *B29L 7/00* | (2006.01) | |
| *B29K 105/00* | (2006.01) | |
| *B29K 75/00* | (2006.01) | |
| *C08G 18/32* | (2006.01) | |

(52) U.S. Cl.
CPC .............. *C08J 5/18* (2013.01); *B29C 39/006* (2013.01); *B29C 39/02* (2013.01); *B29C 67/246* (2013.01); *C08F 283/006* (2013.01); *C08F 290/067* (2013.01); *C08G 18/10* (2013.01); *C08G 18/246* (2013.01); *C08G 18/3819* (2013.01); *C08G 18/672* (2013.01); *C08G 18/6755* (2013.01); *C08G 18/8175* (2013.01); *B29K 2075/00* (2013.01); *B29K 2105/0002* (2013.01); *B29L 2007/002* (2013.01); *C08G 18/324* (2013.01); *C08G 18/3237* (2013.01); *C08G 18/3243* (2013.01); *C08J 2333/12* (2013.01)

(58) Field of Classification Search
CPC .............. C08G 18/6755; C08G 18/672; C08G 18/3237; C08G 18/324; C08G 18/3243; C08F 290/067
See application file for complete search history.

(56) References Cited

U.S. PATENT DOCUMENTS

| | | | | |
|---|---|---|---|---|
| 4,880,872 A | * | 11/1989 | Thomas | C08G 18/637 525/43 |
| 5,008,325 A | * | 4/1991 | Soto | C08G 18/0804 523/205 |
| 5,571,857 A | | 11/1996 | Gruber et al. | |
| 5,594,065 A | | 1/1997 | Tien et al. | |
| 5,716,661 A | * | 2/1998 | Scholz | A61F 13/04 264/131 |
| 6,635,706 B1 | | 10/2003 | Petschke et al. | |
| 9,568,643 B2 | | 2/2017 | Bojkova et al. | |
| 2007/0148471 A1 | * | 6/2007 | Rukavina | B32B 17/1077 428/423.1 |
| 2009/0269568 A1 | * | 10/2009 | Kuhlmann | C08G 18/0823 428/220 |
| 2017/0166684 A1 | | 6/2017 | Ilmenev et al. | |

FOREIGN PATENT DOCUMENTS

| | | |
|---|---|---|
| EP | 0024379 A1 | 3/1981 |
| EP | 0309113 A1 | 3/1989 |
| WO | 2015119957 A1 | 8/2015 |

OTHER PUBLICATIONS

PCT International Search Report and Written Opinion for related application PCT/US17/62666 dated Jan. 22, 2018; 9 pp.
EP Extended Search Report for related application 17873629.4 dated Jun. 5, 2020; 11 pp.

* cited by examiner

*Primary Examiner* — Michael L Leonard
(74) *Attorney, Agent, or Firm* — Armstrong Teasdale LLP

(57) ABSTRACT

Urethane-urea-acrylic cast sheet materials are made from a reaction product of components including polyisocyanate compound having at least two isocyanate functional groups and optional polyol (or pre-reacted urethane prepolymer having at least two isocyanate functional groups), curative having at least two amine functional groups, acrylic monomer, and optional multifunctional monomer having a first functional group having an active hydrogen and a second functional group having at least one double bond. The urethane-urea-acrylic cast sheet materials exhibit excellent impact properties and desirable hardness while also maintaining optical properties such as low haze that can be comparable to that of conventional cast acrylic sheet.

20 Claims, No Drawings

URETHANE UREA ACRYLIC CAST SHEET MATERIALS

CROSS-REFERENCE TO RELATED APPLICATIONS

This application claims priority to U.S. Patent Application Ser. No. 62/425,901 filed Nov. 23, 2016 for "URETHANE UREA ACRYLIC CAST SHEET MATERIALS," which is hereby incorporated by reference in its entirety.

FIELD OF THE INVENTION

This invention relates to urethane-urea-acrylic cast sheet materials. These cast sheet materials exhibit excellent impact properties and desirable hardness while also maintaining optical properties such as low haze that can be comparable to that of conventional cast acrylic sheet.

BACKGROUND OF THE INVENTION

Demand exists for impact resistant clear plastic sheets for applications such as bullet-resistant security panels, shields, facemasks, and other security and personal protection equipment. Such sheets are often formed by laminating or co-joining acrylic sheet, polycarbonate sheet, and glass layers with polyurethane or polyvinyl butyral ("PVB") interlayers, such as by a heat-lamination process using urethane film for bonding.

Cast acrylic sheets are easily formed by cell casting from relatively non-hazardous and inexpensive materials. Problematically, acrylic sheet is brittle and the formed sheets must be very thick or laminated with other materials (e.g., polycarbonate or polyurethane) in order to provide impact resistance sufficient to stop projectiles such as bullets fired from high-powered hand guns.

Cast polyurethane sheets provide superior impact resistance properties as compared to acrylic. Problematically, in contrast to acrylic, cast polyurethane sheet is made from more expensive raw materials and frequently involves the use of hazardous chemicals. Moreover, cast polyurethane is relatively difficult to produce. For example, the starting materials have very high viscosity and often must be maintained at high temperatures so that they can be poured into a cast. Production difficulties also can arise from polyurethane's relatively short pot life and from sticking of the cast polyurethane to the casting surface.

International Pub. No. WO 2015/119957 discloses urethane vinyl copolymers and cast sheets made from the urethane vinyl copolymers. It is possible to use the urethane vinyl copolymers of the WO '957 publication to obtain cast sheets having improved impact resistance relative to that of cast acrylic sheet. However, improved impact resistance is obtained only with a decrease in desirable hardness. This tradeoff between impact resistance and hardness is unacceptable for many applications, such as large free-standing sheets for security purposes. Therefore, using the urethane vinyl copolymers of the WO '957 publication, it is not possible to obtain cast sheet having both excellent impact resistance and desirable hardness while also maintaining desirable optical properties such as low haze.

SUMMARY OF THE INVENTION

Consequently, a need exists for polymeric materials that can be easily cast as sheets that exhibit both excellent impact properties and desirable hardness while also maintaining optical properties such as low haze that can be comparable to that of conventional cast acrylic sheet.

The aforementioned needs are met by one or more aspects of the present invention.

Surprisingly, it has been found that a reaction product, which is formed by adding curative having at least two amine functional groups to polyisocyanate compound and optional polyol (or pre-reacted urethane prepolymer having at least two isocyanate functionalities), acrylic monomer, and optional multifunctional monomer, can be made into urethane-urea-acrylic cast sheet materials that exhibit excellent impact properties, desirable hardness, and low haze.

One aspect of the present invention is directed to cast sheet materials. The cast sheet material comprises a reaction product of components comprising: a polyisocyanate compound comprising at least two isocyanate functional groups; a polyol; a curative comprising at least two amine functional groups; an acrylic monomer comprising at least one double bond; and a multifunctional monomer comprising a first functional group comprising an active hydrogen and a second functional group comprising at least one double bond.

Another aspect of the present invention is a method of making the cast sheet materials as described herein. The method comprises the following steps. Forming a reaction mixture by combining components comprising: a polyisocyanate compound comprising at least two isocyanate functional groups; a polyol; a curative comprising at least two amine functional groups; an acrylic monomer comprising at least one double bond; and a multifunctional monomer comprising a first functional group comprising an active hydrogen and a second functional group comprising at least one double bond. The reaction mixture is cast into a mold. The reaction mixture is reacted in the mold to form the cast sheet material.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to urethane-urea-acrylic cast sheet materials.

In other embodiments, the present invention is directed to methods of making urethane-urea-acrylic cast sheet materials.

Required and optional features of these and further embodiments of the present invention are described.

Urethane-Urea-Acrylic Cast Sheet Materials

In some embodiments, the present invention is directed to urethane-urea-acrylic cast sheet materials.

Advantageously, the cast sheet materials of the present invention exhibit both excellent impact properties and desirable hardness while also maintaining optical properties such as low haze that can be comparable to that of conventional cast acrylic sheet.

Hardness of the cast sheet materials of the present invention can be reported as Rockwell hardness (M scale) measured according to ASTM D785M. The cast sheet material of the present invention has, in some embodiments, a Rockwell hardness (M scale) of at least about 35; and, in other embodiments, a Rockwell hardness (M scale) of at least about 40; and, in further embodiments, a Rockwell hardness (M scale) of at least about 50. In other embodiments, the cast sheet material has a Rockwell hardness (M scale) ranging from about 35 to about 80.

Haze of the cast sheet materials of the present invention can be reported as percent haze measured according to ASTM D1003. The cast sheet material of the present invention has, in some embodiments, a haze of no greater than about 5%; and, in other embodiments, a haze of less than about 3%; and, in further embodiments, a haze of less than about 1%.

Impact resistance of the cast sheet materials of the present invention can be reported as Gardner impact resistance measured at 0.250 inch thickness according to ASTM D5420. The cast sheet material of the present invention has, in some embodiments, a Gardner impact resistance of greater than about 100 in-lb at 0.250 inch thickness; in other embodiments, a Gardner impact resistance of greater than about 320 in-lb at 0.250 inch thickness.

Impact resistance of the cast sheet materials of the present invention also can be reported as V50 critical velocity ballistic rating measured according to MIL-STD-662F-V50. The cast sheet material of the present invention has, in some embodiments, a V50 critical velocity ballistic rating of greater than about 700 ft/sec at 0.250 inch thickness; and, in other embodiments, a V50 critical velocity ballistic rating of greater than about 800 ft/sec at 0.250 inch thickness; and, in further embodiments, a V50 critical velocity ballistic rating of greater than about 900 ft/sec at 0.250 inch thickness. In even further embodiments, the cast sheet material of the present invention has a V50 critical velocity ballistic rating that is at least about 1.9 times the V50 critical velocity ballistic rating of poly(methyl methacrylate) sheet of the same thickness.

In some embodiments, the cast sheet material of the present invention has a combination of a Rockwell hardness (M scale), haze, and impact resistance in which each of these properties has a value that is within any of the corresponding ranges as described herein. For example, in some embodiments, the cast sheet material of the present invention has (a) a Rockwell hardness (M scale) of at least about 35, (b) a haze of less than about 3%, and (c) an impact resistance that is (i) a Gardner impact resistance of greater than about 100 in-lb at 0.250 inch thickness, or (ii) a V50 critical velocity ballistic rating of greater than about 700 ft/sec at 0.250 inch thickness, or (iii) both (i) and (ii). In other embodiments, the cast sheet material of the present invention has (a) a Rockwell hardness (M scale) of at least about 50, (b) a haze of less than about 1%, and (c) an impact resistance that is (i) a Gardner impact resistance of greater than about 320 in-lb at 0.250 inch thickness, or (ii) a V50 critical velocity ballistic rating of greater than about 900 ft/sec at 0.250 inch thickness, or (iii) both (i) and (ii).

In some embodiments, the cast sheet material of the present invention is in the form of a monolithic sheet. Monolithic sheet according to the present invention can have, in some embodiments, a first dimension that is greater than about 0.6 m (2 ft) and a second dimension that is greater than about 0.9 m (3 ft).

Urethane-Urea-Acrylic Reaction Product

Urethane-urea-acrylic cast sheet materials of the present invention include a reaction product of certain components. These components include polyisocyanate compound and optional polyol (or pre-reacted urethane prepolymer), curative, acrylic monomer, and optional multifunctional monomer. In some embodiments, optional additives also are included.

The polyisocyanate compound (or pre-reacted urethane prepolymer) has at least two isocyanate functional groups.

The curative has at least two amine functional groups.

The acrylic monomer has at least one double bond.

The optional multifunctional monomer has a first functional group having an active hydrogen and a second functional group having at least one double bond.

In some embodiments, the reaction product of the present invention forms in the presence of a catalyst for polyurethane formation, an initiator for acrylic polymerization, or both.

In general, it is believed that at least one of the at least two isocyanate functional groups of the polyisocyanate compound (or pre-reacted urethane prepolymer) reacts to form a covalent bond with at least one of the at least two amine functional groups of the curative. It is believed the result is, upon polymerization, a urethane-urea polymer segment.

In some embodiments, in which the multifunctional monomer is present, it is believed that a first of the at least two isocyanate functional groups of the polyisocyanate compound (or pre-reacted urethane prepolymer) reacts to form a covalent bond with at least one of the at least two amine functional groups of the curative, and a second of the at least two isocyanate functional groups of the polyisocyanate compound (or pre-reacted urethane prepolymer) reacts to form a covalent bond with the first functional group of the multifunctional monomer. It is believed the result is, upon polymerization, a urethane-urea polymer segment that is capped at one end with the multifunctional monomer.

In general, it is further believed that, when polymerization of the acrylic monomer, which forms one or more acrylic polymer segments, occurs in the presence, or approximately simultaneously with the formation, of the urethane-urea polymer segment, the result is the urethane-urea-acrylic reaction product of the present invention.

While not intending to be limited to any particular theory, it is believed that, in some embodiments, the reaction product is in the form of a copolymer having at least two acrylic polymer segments and at least one urethane-urea polymer segment. In such embodiments, it is believed that the at least two acrylic polymer segments are crosslinked by the at least one urethane-urea polymer segment. That is, there is covalent bonding between the urethane-urea polymer segment and each of the acrylic polymer segments.

In other embodiments, while not intending to be limited to any particular theory, it is believed that the reaction product is in the form of an interpenetrating polymer network having at least one acrylic polymer segment and at least one urethane-urea polymer segment. In such embodiments, it is believed at least a portion of the at least one acrylic polymer segment is interlaced with at least a portion of the at least one urethane-urea polymer segment. That is, while there is not covalent bonding between the urethane-urea polymer segment and the acrylic polymer segment, these different polymer segments are physically entangled in such a way that they cannot be separated unless chemical bonds are broken.

Regardless of the form of the reaction product of the present invention, the urethane-urea polymer segment is present in the reaction product in an amount, in some embodiments, from about 10 to about 70 weight percent, by weight of the reaction product; and, in other embodiments, from about 15 to about 60 weight percent, by weight of the reaction product; and, in further embodiments, from about 20 to about 40 weight percent, by weight of the reaction product. In other embodiments, the urethane-urea polymer segment is present in the reaction product in an amount from about 10 to about 25 weight percent, by weight of the reaction product.

Correspondingly, regardless of the form of the reaction product of the present invention, the acrylic polymer segment is present in the reaction product in an amount, in some embodiments, from about 30 to about 90 weight percent, by weight of the reaction product; and, in other embodiments, from about 40 to about 85 weight percent, by weight of the reaction product; and, in further embodiments, from about 60 to about 80 weight percent, by weight of the reaction product. In other embodiments, the acrylic polymer segment is present in the reaction product in an amount from about 75 to about 90 weight percent, by weight of the reaction product.

In general, each of the components of the reaction product of the present invention is used in an amount sufficient to react under conditions described herein to provide a reaction product as described herein. For example, in some embodiments, each component of the reaction product is used in a substantially stoichiometric amount. However, as readily understood by those skilled in the art, specific amounts of each component (e.g., expressed in weight percent of a reaction mixture) can depend on a number of factors, such as whether a pre-reacted urethane prepolymer is used and, if so, what are the characteristics of the prepolymer. Other factors include target characteristics of the cast sheet material, such as sheet thickness or desired properties for hardness, haze, impact resistance, etc., which may vary based on the particular intended application for the cast sheet material.

The cast sheet materials of the present invention can comprise, consist essentially of, or consist of the reaction product of those ingredients or components as described herein.

Additionally, it is contemplated that, in some embodiments, the cast sheet materials of the present invention can be essentially free of any substance(s) not among those ingredients or components as described herein. As used herein, the term "essentially free of" a certain substance means, in some embodiments, that no amount of that substance is intentionally incorporated into the cast sheet material; and, in other embodiments, that less than 1 weight percent of the substance is intentionally incorporated into the cast sheet material; and, in further embodiments, it means that less than 0.1 weight percent of the component is intentionally incorporated into the cast sheet material; and, in even further embodiments, it means that less than 0.01 weight percent of the component is intentionally incorporated into the cast sheet material.

Polyisocyanate Compound and Optional Polyol (or Pre-Reacted Urethane Prepolymer)

Components of the reaction product of the present invention include components capable of reacting, together with the curative, to form a urethane-urea polymer segment as described herein.

In some embodiments, these components include polyisocyanate compound having at least two isocyanate functional groups and optional polyol.

In other embodiments, at least a portion of the polyisocyanate compound and at least a portion of the optional polyol are present in the form of pre-reacted urethane prepolymer. In such embodiments, the pre-reacted urethane prepolymer has at least two isocyanate functional groups.

While not intending to be limited to any particular theory, it is believed that the isocyanate functional groups of the urethane polymer segment are reactive with the curative, and, in some embodiments, the optional multifunctional monomer. Thereby, it is believed, upon polymerization, a urethane-urea polymer segment is provided.

Suitable polyisocyanate compounds include those having the formula R—(N=C=O)$_n$, where R can be a straight or branched chain hydrocarbyl or substituted hydrocarbyl moiety containing from about 2 to about 20 carbon atoms, a straight or branched chain cyclic hydrocarbyl or substituted cyclic hydrocarbyl moiety containing from 4 to about 20 carbon atoms, a substituted or unsubstituted aromatic moiety containing from 6 to about 20 carbon atoms or from 6 to 14 carbon atoms, or combinations thereof, and where the number of isocyanate units, "n", is an integer or represents an average functionality of about 2 or greater, such from about 2 to about 3, or about 2.5. As used herein, "hydrocarbyl" refers to a molecule or residue consisting of carbon and hydrogen atoms, and "substituted hydrocarbyl" refers hydrocarbyl moieties which are substituted with at least one atom other than carbon including moieties in which a carbon chain atom is substituted with a heteroatom such as nitrogen, oxygen, sulfur, silicon, phosphorous, boron, or a halogen atom, and moieties in which the carbon chain comprises additional substituents.

Examples of polyisocyanate compounds within the scope of the present invention include, but are not limited to, the 2,2'-, 2,4'- and 4,4'-isomers of diphenylmethane diisocyanate ("MDI"), polymeric MDI, carbodiimide-modified liquid MDI, 4,4'-, 2,4-cis- and trans-isomers of dicyclohexylmethane diisocyanate ("H$_{12}$MDI"), p-phenylene diisocyanate, m-phenylene diisocyanate, 2,4- and 2,6-isomers of toluene diisocyanate ("TDI"), 3,3'-dimethyl-4,4'-biphenylene diisocyanate, isophoronediisocyanate ("IPDI"), hexamethylene diisocyanate ("HDI"), naphthalene diisocyanate, xylene diisocyanate, m- and p-tetramethylxylene diisocyanate ("TMXDI"), ethylene diisocyanate, propylene-1,2-diisocyanate, tetramethylene-1,4-diisocyanate, cyclohexyl diisocyanate, 1,5-pentamethylene diisocyanate, dodecane-1,12-diisocyanate, cyclobutane-1,3-diisocyanate, cyclohexane-1,3-diisocyanate; cyclohexane-1,4-diisocyanate, 1-isocyanato-3,3,5-trimethyl-5-isocyanatomethylcyclohexane, methyl cyclohexylene diisocyanate, isocyanurate of HDI, triisocyanate of 2,4,4-trimethyl-1,6-hexane diisocyanate, tetracene diisocyanate, napthalene diisocyanate, anthracene diisocyanate, polymethylene polyphenylisocyanate, and mixtures thereof. In some aspects of the present invention, the polyisocyanate monomer is dicyclohexyl methane diisocyanate or hexamethylene diisocyanate.

Suitable optional polyols include a short chain diol or triol. Examples of suitable diols and triols include, without limitation, ethylene glycol, diethylene glycol, triethylene glycol, propylene glycol, dipropylene glycol, tripropylene glycol, 1,3-propanediol, 1,3-butanediol, 1,4-butanediol, 1,6-hexanediol, 1,4-cyclohexanedimethanol, a mixture of 1,4- and 1,3-cyclohexanedimethanol (UNOXOL diol available from Dow Chemical Co.), glycerol, trimethylolpropane ("TMP") and 1,2,6-hexanetriol.

Suitable optional polyols also include a long chain polyether diol of the structure HO—[R$_1$—O]$_n$—H where R$_1$ is a straight or branched hydrocarbyl or substituted hydrocarbyl chain comprising from 1 to about 20 carbon atoms, where n is from 1 to about 50. Such long chain diols are generally a mixture of compounds having varying "n" values, wherein "n" is expressed as an average. The hydrocarbyl or substituted hydrocarbyl chain can have saturated or unsaturated bonds and substituted or unsubstituted aromatic and cyclic groups. Examples include, but are not limited to, polytetramethylene ether glycol, polyethylene propylene glycol, polyoxypropylene glycol. Suitable polytetramethylene polyols are available commercially and include, for instance, TERATHANE® 250, TERATHANE® 650, TERATHANE® 1000 and TERATHANE® 2000, (where $R_1$ is $C_4H_8$, the average molecular weight is about 250, 650, 1000, and 2000, respectively, and the hydroxyl functionality is 2). In addition, other types of diols are suitable for the practice of the present invention including, but not limited to, polyester, polycarbonate, polycaprolactone, hydroxyl-terminated polybutadiene, and mixtures thereof.

In some embodiments of the present invention, at least a portion of the polyisocyanate compound and at least a portion of the optional polyol are present in the form of pre-reacted urethane prepolymer that has at least two isocyanate functional groups.

Suitable pre-reacted urethane prepolymers are available commercially. Examples include TRIVEX TVX-58 from PPG Industries; DESMODUR XP-2599 and BAYTEC WP-260, both from Covestro; and ADIPRENE LW520 and ADIPRENE LW570, both from Chemtura.

Curative

Components of the reaction product of the present invention include curative that has at least two amine functional groups.

As described herein, it is believed that at least one of the at least two amine functional groups of the curative is reactive to form a covalent bond with at least one of the at least two isocyanate functional groups of the polyisocyanate compound (or the pre-reacted urethane prepolymer), thereby providing, upon polymerization, a urethane-urea polymer segment.

Suitable curative includes diamine curative, and, preferably, aromatic diamine curative. In some embodiments, the curative is diethyltoluenediamine (DETDA); 4,4'-methylene bis(2-chloroaniline) (MOCA); 2,4-diamino-3,5-dimethylthiotoluene (DMTDA); derivatives thereof; or combinations thereof.

Commercially available examples of suitable curative include TRIVEX COMPONENT B from PPG Industries; BAYTEC CURATIVE W from Covestro; ETHACURE 100LC, ETHACURE 300 from Albemarle; and LONZACURE DETDA 80LC from Lonza.

Diamine curatives such as DETDA are known typically to have very short gel times (e.g., less than 10 minutes) when included in polymeric mixtures with polyisocyanates. Disadvantageously, very short gel times can necessitate expensive mixing and mold filling equipment and can limit the size of sheet that can be cast from such polymeric mixtures to less than about 2×3 feet (i.e., about 0.6×0.9 meters).

Surprisingly, with the present invention, gel times for polymeric mixtures including diamine curatives such as DETDA and polyisocyanates can be drastically extended.

Without intending to be limited to any particular theory, it is believed that combining the curative and the polyisocyanate compound (or the pre-reacted urethane prepolymer) together with the acrylic monomer pursuant to the present invention causes a dilution of the curative and the polyisocyanate compound (or the pre-reacted urethane prepolymer) in the acrylic monomer, thereby drastically extending the gel time.

Advantageously, with the drastically extended gel times of the present invention, it is possible to make cast sheet materials that are larger than about 2×3 feet (i.e., about 0.6×0.9 meters). It is also possible to make the cast sheet materials of the present invention without expensive mixing and mold filling equipment. Instead, pursuant to some embodiments of the present invention, mold filling and the start of the casting process are performed at ambient temperature, for example, from about 20° C. to about 25° C.

Acrylic Monomer

Components of the reaction product of the present invention include acrylic monomer that has at least one carbon-carbon double bond.

The acrylic monomer forms an acrylic polymer segment by a free radical chain polymerization reaction through contact of the acrylic monomer with an initiator for acrylic polymerization.

As described herein, it is believed that when polymerization of the acrylic monomer occurs in the presence, or approximately simultaneously with the formation, of the urethane-urea polymer segment, the result is the urethane-urea-acrylic reaction product of the present invention.

Suitable acrylic monomers include an aromatic vinyl monomers such as styrene, α-methylstyrene, vinyl toluene, t-butylstyrene, cyanostyrene and chlorostyrene; a vinyl cyanide monomer such as acrylonitrile or methacrylonitrile; an acrylate monomer such as methyl acrylate, ethyl acrylate, butyl acrylate, hexyl acrylate, ethyl hexyl acrylate, cyclohexyl acrylate, octyl acrylate, decyl acrylate, octadecyl acrylate, hydroxyethyl acrylate, methoxyethyl acrylate, glycidyl acrylate or phenyl acrylate; a methacrylate monomer such as methyl methacrylate, ethyl methacrylate, butyl methacrylate, hexyl methacrylate, cyclohexyl methacrylate, octyl methacrylate, decyl methacrylate, octadecyl methacrylate, glycidyl methacrylate, benzyl methacrylate or phenyl methacrylate; an amide monomer such as acrylamide or methacrylamide; an unsaturated carboxylic acid monomer such as acrylic acid, methacrylic acid or itaconic acid; a vinyl halide monomer such as vinyl chloride or vinylidene chloride; an aliphatic vinyl ester monomer such as vinyl formate, vinyl acetate, vinyl propionate, vinyl decanate or vinyl octadecanate; an olefin monomer such as ethylene, propylene, 1-butene, isobutylene or 2-butene; a maleimide monomer such as maleimide, N-methyl maleimide, N-ethyl maleimide, N-propyl maleimide, N-cyclohexyl maleimide, N-phenyl maleimide or N-toluyl maleimide; an acid anhydride monomer such as maleic anhydride; a conjugated diene monomer such as butadiene, isoprene or chloroprene; a vinyl ether monomer such as methyl vinyl ether, ethyl vinyl ether, propyl vinyl ether, hexyl vinyl ether, decyl vinyl ether, octadecyl vinyl ether, phenyl vinyl ether, cresyl vinyl ether or glycidyl vinyl ether; a vinyl ketone monomer such as methyl vinyl ketone or phenyl vinyl ketone; and vinyl pyridine.

In some embodiments of the present invention, the acrylic monomer is methyl methacrylate.

Methyl methacrylate is commercially available from various sources, including Lucite and Dow Chemical.

Optional Multifunctional Monomer

In some embodiments, components of the reaction product of the present invention include optional multifunctional monomer.

The multifunctional monomer has a first functional group having an active hydrogen. In some embodiments, the first functional group is reactive with a first of the at least two isocyanate functional groups of the polyisocyanate compound (or the pre-reacted urethane prepolymer). The multifunctional monomer also has a second functional group having at least one double bond. In some embodiments, the second functional group is reactive with the at least one double bond of the acrylic monomer.

As described herein, in embodiments of the present invention in which the multifunctional monomer is present, it is believed that a first of the at least two isocyanate functional groups of the polyisocyanate compound (or pre-reacted urethane prepolymer) reacts to form a covalent bond with at least one of the at least two amine functional groups of the curative, and a second of the at least two isocyanate functional groups of the polyisocyanate compound (or pre-reacted urethane prepolymer) reacts to form a covalent bond with the first functional group of the multifunctional monomer. It is believed the result is, upon polymerization, a urethane-urea polymer segment that is capped at one end with the multifunctional monomer.

In some embodiments, the first functional group is primary amine, secondary amine, carboxylic acid, thiol, or hydroxyl. In the case of primary or secondary amino, the isocyanate and amino react to form a urea linkage. In the case of carboxylic acid, the isocyanate and acid react to form an amide linkage. In the case of thiol, the isocyanate and thiol react to form a thiocarbamate linkage. In the case of hydroxyl, the isocyanate and hydroxyl react to form a urethane linkage.

In some embodiments, the second functional group that is reactive with the double bond of the acrylic monomer is a double bond (i.e., alkenyl), such that the second functional group is copolymerizable with the acrylic monomer. As used herein, "alkenyl" refers to groups formed from straight chain, branched or cyclic hydrocarbyl or substituted hydrocarbyl residues containing at least one carbon to carbon double bond, including ethylenically mono-, di- or polyunsaturated alkyl or cycloalkyl groups. For example, such moieties may be unsaturated $C_{2-40}$, $C_{2-20}$ or $C_{2-10}$ alkyl (i.e., alkenyl) or substituted alkyl, substituted or unsubstituted unsaturated cyclic hydrocarbyls, aromatics having unsaturated substituents, unsaturated carboxylic acid and carboxylic acid esters, and vinyl esters. Examples of cyclic and substituted aromatic compounds include norbornene and styrene. Examples of substituted unsaturated carboxylic acids include acrylic acid and methacrylic acid. Examples of unsaturated carboxylic acid esters include methyl acrylate, ethyl acrylate, butyl acrylate, methyl methacrylate and ethyl methacrylate. An example of a vinyl ester compound includes vinyl acetate.

Suitable multifunctional monomers include hydroxyethyl methacrylate, hydroxyethylacrylate, hydroxypropyl(meth)acrylate, aminoethyl acrylate, 2,2-bis[4-(2-hydroxy-3-methacryloxypropoxy)phenyl]propane, and combinations thereof.

Optional Additives

In some embodiments, the cast sheet materials of the present invention include one or more optional additives.

Suitable additives include adhesion promoters; biocides; anti-fogging agents; anti-static agents; bonding agents; catalysts and initiators; colorants; coupling agents; dispersants; flame retardants and smoke suppressants; lubricants; micas; plasticizers; molecular weight regulators; processing aids; release agents; stabilizers; ultraviolet light absorbers; and combinations thereof.

In some embodiments, the reaction product of the present invention forms in the presence of a catalyst for polyurethane formation, an initiator for acrylic polymerization, or both.

Suitable polyurethane formation catalysts are known in the art and include tertiary amines and metal complexes. Examples of tertiary amine catalysts include, without limitation, triethylenediamine (TEDA or DABCO) and dimethylcyclohexylamine (DMCHA). Examples of metal complexes include, without limitation, bismuth carboxylates, tin carboxylates, tin alkyl carboxylates, tin oxides and tin mercapatans. An example of one suitable catalyst is dibutyltin diluarate (DBTDL).

Suitable acrylic polymerization initiators are known in the art and include organic peroxides including alkyl hydroperoxides, such as t-butyl, p-menthyl or cumyl hydroperoxide, t-butyl perpivalate, and dialkyl or diaryl peroxides, including di-t-butyl or di-cumyl peroxide, 2,5-dimethyl-2,5-di(t)butyl-peroxy(hexane) and dibenzoyl peroxide and (iii) azo compounds such as 2,2'-azobisisobutyronitrile, 2,2'-azobis(2,4-dimethylvaleronitrile), and 2,2'-azobis(4-methoxy-2,4-dimethylvaleronitrile).

Methods of Making Cast Sheet Materials

In some embodiments, the present invention is directed to methods of making cast sheet materials.

Methods of the present invention generally include a first step of forming a reaction mixture, a second step of casting the reaction mixture into a mold, and a third step of reacting the reaction mixture to form the cast sheet materials. In some embodiments, an optional post-curing or annealing step can be performed.

The first step of forming a reaction mixture includes combining certain components. These components include polyisocyanate compound and optional polyol (or pre-reacted urethane prepolymer), curative, acrylic monomer, and optional multifunctional monomer, as described herein.

In some embodiments, at least a portion of the polyisocyanate compound and at least a portion of the optional polyol are present in the form of pre-reacted urethane prepolymer, and the pre-reacted urethane prepolymer comprises at least two isocyanate functional groups.

In some embodiments, the reaction mixture includes a catalyst for polyurethane formation, an initiator for acrylic polymerization, or both.

In some embodiments, the first step of forming the reaction mixture occurs in a single reaction vessel.

The second step of casting includes pouring or otherwise providing the reaction mixture into a mold.

Typically, a mold is defined by a space between two plates (e.g., tempered glass plates) whereby the space is a desired thickness for the sheet. After the reaction mixture is provided into the mold, the mold typically is sealed with a gasket or the like.

In some embodiments, the second step of casting is performed while the reaction mixture is at ambient temperature, for example, from about 20° C. to about 25° C.

The third step of reacting includes reacting the reaction mixture in the mold to form the cast sheet material.

Typically, the filled mold is heated to cause the reaction mixture to react to form the cast sheet material. For example, the reaction and curing temperature can be controlled by immersing the mold in a water bath or a circulating air oven.

In some embodiments, the catalyst for polyurethane formation and the initiator for acrylic polymerization are included in the reaction mixture and are selected based on activity at a similar temperature range, such that a one-step reaction can be performed. That is, the urethane-urea polymer segment and the acrylic polymer segment are formed substantially simultaneously.

For example, in some embodiments, the catalyst for polyurethane formation and the initiator for acrylic polymerization are selected to exhibit sufficient activity in the temperature range of from about 40° C. to about 80° C. In such embodiments, the reaction mixture is heated to a temperature of from about 40° C. to about 80° C. and held for a time sufficient to complete formation of both the urethane-urea polymer segment and the acrylic polymer segment.

In other embodiments, the catalyst for polyurethane formation and the initiator for acrylic polymerization are included in the reaction mixture and are selected based on activity at different temperature ranges, such that a two-step reaction can be performed. That is, the urethane-urea polymer segment and the acrylic polymer segment are formed substantially in series.

For example, in some embodiments, the polyurethane formation catalyst is selected to exhibit sufficient activity in the temperature range of from about 30° C. to about 70° C., or from about 30° C. to about 60° C., and the acrylic polymerization initiator is selected to exhibit sufficient activity in the temperature range of from about 70° C. to about 120° C., or from about 80° C. to about 110° C. In such embodiments, the reaction mixture, first, is heated to less than about 70° C. and held for a time sufficient to complete formation of the urethane-urea polymer segment, and, thereafter, is heated to greater than about 70° C. and held for a time sufficient to complete formation of the acrylic polymer segment.

According to methods of the present invention, the reaction mixture has a gel time that is, in some embodiments, greater than about 10 minutes; and, in other embodiments, greater than about 20 minutes; and, in further embodiments, greater than about 40 minutes.

According to methods of the present invention, it is possible to make cast sheet material having a first dimension that is greater than about 0.6 m (2 ft) and a second dimension that is greater than about 0.9 m (3 ft).

USEFULNESS OF THE INVENTION

Advantageously, the cast sheet materials of the present invention exhibit both excellent impact properties and desirable hardness while also maintaining optical properties such as low haze that can be comparable to that of conventional cast acrylic sheet. Therefore, the cast sheet materials of the present invention can be useful for any application that demands a combination of some or all of these properties.

Non-limiting examples of possible applications include bullet-resistant security panels, shields, facemasks, and other security or personal protection equipment. Other possible applications include canopies, covers, enclosures, panels, windows, windshields, and the like for equipment, structures, or vehicles used in, for example, agriculture, aerospace, automotive, aviation, construction, housing, hunting, marine, military, rail, recreation, security, sports, and transportation.

Examples

Non-limiting examples of various embodiments of the present invention are provided.

Table 1 below shows sources of ingredients used in the Examples. Tables 2a to 2d below show the formulations and certain properties of the Examples.

For each cast sheet material of the Examples, the ingredients were mixed together at ambient temperature to form a reaction mixture. The reaction mixture was vacuumed to remove dissolved air (e.g., oxygen). Then, the reaction mixture was poured into a mold, which is constructed of two glass plates separated by a vinyl gasket (which sets the thickness of the final sheet) and held together by spring clamps. Next, the mold was placed in a forced air heating oven and exposed to an initial temperature in the range between 50° C. and 90° C. (depending on the type and concentration of the radical initiator used) for 14 to 26 hours. Thereafter, the forced air heating over was raised to a temperature between 100° C. and 120° C. in order to complete the polymerization reactions. After cooling, the mold was disassembled and the properties of the cast sheet material were tested.

Reported properties were tested according to the identified standard, except that Notched Charpy was tested according to ASTM D6110 with a modification whereby all specimens were notched to a depth of 0.100 inch using a band saw blade (¼ inch×0.014 inch) and the notch depth was verified using a Vernier caliper prior to testing.

Table 1 below shows sources of ingredients used in the Examples.

TABLE 1

| Ingredient | Brand | Source |
| --- | --- | --- |
| Methyl methacrylate (MMA) | Methyl methacrylate (MMA) | Multiple |
| Urethane prepolymer | TRIVEX TVX-58 | PPG Industries |
| Urethane prepolymer | DESMODUR XP-2599 | Covestro |
| Urethane prepolymer | BAYTEC WP260 | Covestro |
| Urethane prepolymer | ADIPRENE LW570 | Chemtura |
| Diethyltoluene diamine | TRIVEX COMPONENT B | PPG Industries |
| Diethyltoluene diamine | BAYTEC CURATIVE W | Covestro |
| 2-Propenoic acid, 2-methyl, 2-propen-1-yl ester (Allyl methacrylate) | VISIOMER AMA | Evonik |
| Trimethylolpropane trimethacrylate (TMPTMA) | SARTOMER SR350 | Sartomer |
| Diurethane dimethacrylate | VISIOMER HEMATMDI | Evonik |
| Hydroxyethylmethacrylate (HEMA) | Hydroxyethylmethacrylate (HEMA) | Dow Chemical |
| Methacrylic acid (MAA) | Methacrylic acid (MAA) | Multiple |
| Organo-tin catalyst (DBTDL) | DABCO T-12 | Air Products |
| Organo-peroxide | LUPEROX | Arkema |
| Terpinolene | Terpinolene | Mulitple |

Table 2a below shows the formulations and certain properties of Comparative Examples A and B and Examples 1 to 2.

TABLE 2a

| Example Ingredient | A | B | 1 | 2 |
| --- | --- | --- | --- | --- |
| | Weight Percent (wt. %) | | | |
| MMA | 99.8 | 60 | 78 | 69 |
| TRIVEX TVX-58 | — | 33 | 18 | 26 |
| DESMODUR XP-2599 | — | — | — | — |
| BAYTEC WP260 | — | — | — | — |
| ADIPRENE LW570 | — | — | — | — |
| TRIVEX COMPONENT B | — | — | 2 | 3 |
| BAYTEC CURATIVE W | — | — | — | — |
| VISIOMER AMA | — | — | — | — |
| SARTOMER SR350 | — | — | — | — |
| VISIOMER HEMATMDI | — | — | — | — |
| HEMA | — | 7 | 1 | 1 |
| MAA | — | — | 1 | 1 |
| DABCO T-12 | — | 0.01 | 0.01 | 0.01 |
| LUPEROX | 0.01-0.05 | 0.01-0.05 | 0.01-0.05 | 0.01-0.05 |
| TERPINOLENE | 0.01 | 0.05 | 0.05 | 0.05 |
| TOTAL | 100 * | 100 * | 100 * | 100 * |
| Property | | | | |
| Rockwell Hardness (M scale) (ASTM D785) | 100 | 34 | 77 | 37 |
| Vicat (° C.) (ASTM D1525) | 103 | 66 | 115 | 103 |
| VLT (%) (ASTM D1003) | 92 | 92 | 88 | 88 |

TABLE 2a-continued

| Example<br>Ingredient | A | B | 1 | 2 |
|---|---|---|---|---|
| | Weight Percent (wt. %) | | | |
| Haze (%) (ASTM D1003) | <0.5 | <1 | <1 | <1 |
| Gardner Impact (in-lb)<br>(0.250 inch thickness)<br>(ASTM D5420) | 24 | 90 | >320 | >320 |
| Notched Charpy (ft-lb/in)<br>(Modified ASTM D6110) | 0.3 | 0.53 | 1.6 | 2.5 |
| V50 Ballistic (ft/sec)<br>(0.250 inch thickness)<br>(MIL-STD-662F-V50) | 489 | — | 933 | — |

* Totals may not equal 100% due to rounding.

Table 2b below shows the formulations and certain properties of Examples 3 to 5.

TABLE 2b

| Example<br>Ingredient | 3 | 4 | 5 |
|---|---|---|---|
| | Weight Percent (wt. %) | | |
| MMA | 59 | 89 | 78 |
| TRIVEX TVX-58 | 35 | — | — |
| DESMODUR XP-2599 | — | 9 | 18 |
| BAYTEC WP260 | — | — | — |
| ADIPRENE LW570 | — | — | — |
| TRIVEX COMPONENT B | 4 | 1 | — |
| BAYTEC CURATIVE W | — | — | 2 |
| VISIOMER AMA | — | — | — |
| SARTOMER SR350 | — | — | — |
| VISIOMER HEMATMDI | — | — | — |
| HEMA | 1 | 0.3 | 1 |
| MAA | 1 | 0.2 | 1 |
| DABCO T-12 | 0.01 | 0.01 | 0.01 |
| LUPEROX | 0.01-0.05 | 0.01-0.05 | 0.01-0.05 |
| TERPINOLENE | 0.05 | 0.02 | 0.01 |
| TOTAL | 100 * | 100 * | 100 * |
| Property | | | |
| Rockwell Hardness<br>(M scale) (ASTM D785) | 40 | 69 | 57 |
| Vicat (° C.) (ASTM D1525,) | 83 | — | 112 |
| VLT (%) (ASTM D1003) | 90 | 90 | 92 |
| Haze (%) (ASTM D1003) | <1 | 1.1 | <1 |
| Gardner Impact (in-lb)<br>(0.250 inch thickness)<br>(ASTM D5420) | >320 | >320 | >320 |
| Notched Charpy (ft-lb/in)<br>(Modified ASTM D6110) | 2.3 | 1.6 | 1.1 |
| V50 Ballistic (ft/sec)<br>(0.250 inch thickness)<br>(MIL-STD-662F-V50) | 960 | — | — |

* Totals may not equal 100% due to rounding.

Table 2c below shows the formulations and certain properties of Examples 6 to 9.

TABLE 2c

| Example<br>Ingredient | 6 | 7 | 8 | 9 |
|---|---|---|---|---|
| | Weight Percent (wt. %) | | | |
| MMA | 85 | 84 | 83 | 72 |
| TRIVEX TVX-58 | — | — | — | 22 |
| DESMODUR XP-2599 | 14 | 14 | 14 | — |
| BAYTEC WP260 | — | — | — | — |
| ADIPRENE LW570 | — | — | — | — |
| TRIVEX COMPONENT B | 1 | 1 | 1 | 3 |
| BAYTEC CURATIVE W | — | — | — | — |
| VISIOMER AMA | — | — | 1 | — |
| SARTOMER SR350 | — | 0.4 | — | — |
| VISIOMER HEMATMDI | — | — | — | 1 |
| HEMA | — | 0.5 | 0.5 | 1 |
| MAA | — | 0.1 | 0.1 | 1 |
| DABCO T-12 | 0.01 | 0.01 | 0.01 | 0.01 |
| LUPEROX | 0.01-0.05 | 0.01-0.05 | 0.01-0.05 | 0.01-0.05 |
| TERPINOLENE | 0.01 | 0.02 | 0.02 | 0.02 |
| TOTAL | 100 * | 100 * | 100 * | 100 * |
| Property | | | | |
| Rockwell Hardness<br>(M scale) (ASTM D785) | 52 | 56 | 54 | 64 |
| Vicat (° C.) (ASTM D1525,) | — | 103 | 101 | — |
| VLT (%) (ASTM D1003) | 90 | 92 | 92 | 90 |
| Haze (%) (ASTM D1003) | <1 | <1 | <1 | <1 |
| Gardner Impact (in-lb)<br>(0.250 inch thickness)<br>(ASTM D5420) | >320 | >320 | >320 | >320 |
| Notched Charpy (ft-lb/in)<br>(Modified ASTM D6110) | 1.8 | 1.6 | 1.7 | 1.5 |
| V50 Ballistic (ft/sec)<br>(0.250 inch thickness)<br>(MIL-STD-662F-V50) | — | — | — | — |

* Totals may not equal 100% due to rounding.

Table 2d below shows the formulations and certain properties of Examples 10 to 11.

TABLE 2d

| Example<br>Ingredient | 10 | 11 |
|---|---|---|
| | Weight Percent (wt. %) | |
| MMA | 90 | 79 |
| TRIVEX TVX-58 | 4 | — |
| DESMODUR XP-2599 | 5 | — |
| BAYTEC WP260 | — | — |
| ADIPRENE LW570 | — | 17 |
| TRIVEX COMPONENT B | 1 | — |
| BAYTEC CURATIVE W | — | 2 |
| VISIOMER AMA | — | — |
| SARTOMER SR350 | — | — |
| VISIOMER HEMATMDI | — | — |
| HEMA | 0.3 | 1 |
| MAA | — | 1 |
| DABCO T-12 | 0.01 | 0.01 |
| LUPEROX | 0.01-0.05 | 0.01-0.05 |
| TERPINOLENE | 0.01 | 0.01 |
| TOTAL | 100 * | 100 * |
| Property | | |
| Rockwell Hardness<br>(M scale) (ASTM D785) | 69 | 71 |
| Vicat (° C.) (ASTM D1525,) | — | 108 |
| VLT (%) (ASTM D1003) | — | 89 |
| Haze (%) (ASTM D1003) | 5 | <1 |
| Gardner Impact (in-lb)<br>(0.250 inch thickness)<br>(ASTM D5420) | >320 | 300 |
| Notched Charpy (ft-lb/in)<br>(Modified ASTM D6110) | 1.6 | 1.0 |
| V50 Ballistic (ft/sec)<br>(0.250 inch thickness)<br>(MIL-STD-662F-V50) | 984 | — |

* Totals may not equal 100% due to rounding.

The Examples show that the urethane-urea-acrylic cast sheet materials of the present invention have impact resistance (Gardner impact resistance or V50 critical velocity ballistic rating or both) that is significantly improved relative that of poly(methyl methacrylate) sheet (e.g., Comparative Example A).

For instance, Comparative Example A has a V50 critical velocity ballistic rating of 489 ft/sec and a Gardner impact resistance of 24 in-lb. In contrast, Example 1 has a V50 critical velocity ballistic rating of 933 ft/sec, Example 3 has a V50 critical velocity ballistic rating of 960 ft/sec, and Example 10 has a V50 critical velocity ballistic rating of 984 ft/sec. Additionally, each of Examples 1, 3, and 10 has a Gardner impact resistance of greater than 320 in-lb.

Thus, using at least the cast sheet materials of any of Examples 1, 3, and 10, it is possible to achieve a V50 critical velocity ballistic rating that is at least about 1.9 times the V50 critical velocity ballistic rating of poly(methyl methacrylate) sheet of the same thickness.

The V50 critical velocity ballistic testing was not performed on all of the Examples. However, it is believed that other impact resistance testing, such as Gardner impact resistance, can be used to provide an indication of a cast sheet material's performance under the V50 critical velocity ballistic testing.

For instance, each of Examples 1 to 10 has a Gardner impact resistance of greater than 320 in-lb and Example 11 has a Gardner impact resistance of about 300 in-lb. In contrast, Comparative Example A has a Gardner impact resistance of only 24 in-lb. Thus, it would be expected that each of Examples 2, 4 to 9, and 11, like each of Examples 1, 3, and 10, has a V50 critical velocity ballistic rating that is at least comparable to if not better than that of poly(methyl methacrylate) sheet of the same thickness.

The Examples also show that the urethane-urea-acrylic cast sheet materials of the present invention have both improved impact resistance as described above and desirable hardness, while also maintaining optical properties such as low haze that can be comparable to that of conventional cast acrylic sheet, which is a combination of properties not possible with urethane-vinyl cast sheets as taught by WO 2015/119957 (e.g., Comparative Example B).

For instance, Comparative Example B has a Rockwell hardness (M scale) of 34 and a haze that is less than 1%. However, Comparative Example B has a Gardner impact resistance of only 90 in-lb. In contrast, surprisingly, each of Examples 1 to 9 and 11 has a Gardner impact resistance that is significantly improved relative to the impact resistance of Comparative Example B, while each of Examples 1 to 9 and 11 also has comparable or better hardness and comparable haze relative to those of Comparative Example B. That is, each of Examples 1 to 9 and 11 has a Rockwell hardness (M scale) that is greater than about 35, and, in some instances, greater than about 50; a haze that is less than 3%, and, in some instances, less than 1%; and, a Gardner impact resistance that is greater than about 100 in-lb, and, in some instances, greater than 320 in-lb.

Although Example 10 does not have a haze that is less than 3%, it does have a Rockwell hardness (M scale) that is greater than about 50 and a Gardner impact resistance that is greater than 320 in-lb. Thus, cast sheet materials of Example 10 can still be useful for applications in which improved impact resistance and relatively high hardness are desired or required, but very low haze is not desired or required.

Without undue experimentation, those skilled in the art can utilize the written description of the present invention, including the Examples, to prepare urethane-urea-acrylic cast sheet materials that exhibit excellent impact properties and desirable hardness while also maintaining optical properties such as low haze comparable to that of conventional cast acrylic sheet.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A cast sheet material comprising a reaction product of components comprising:
    a polyisocyanate compound comprising at least two isocyanate functional groups;
    a polyol;
    a curative comprising at least two amine functional groups, wherein the reaction product comprises the curative from 1 to 4 percent by weight of the reaction product;
    an acrylic monomer comprising at least one double bond; and
    a multifunctional monomer comprising a first functional group comprising an active hydrogen and a second functional group comprising at least one double bond,
    wherein the reaction product is in a form of a copolymer comprising a first acrylic polymer segment and a second acrylic polymer segment crosslinked by a urethane-urea polymer segment formed from the polyisocyanate compound and the curative.

2. The cast sheet material of claim 1, wherein at least a portion of the polyisocyanate compound and at least a portion of the polyol are present in the form of a pre-reacted urethane prepolymer, and wherein the pre-reacted urethane prepolymer comprises the at least two isocyanate functional groups.

3. The cast sheet material of claim 1, wherein the curative comprises an aromatic diamine.

4. The cast sheet material of claim 1, wherein the curative is selected from the group consisting of diethyltoluenediamine (DETDA), 4,4'-methylene bis(2-chloroaniline) (MOCA), 2,4-diamino-3,5-dimethylthiotoluene (DMTDA), derivatives thereof, and combinations thereof.

5. The cast sheet material of claim 1, wherein the first functional group is selected from the group consisting of primary amine, secondary amine, carboxylic acid, thiol, and hydroxyl, and wherein the second functional group is a double bond.

6. The cast sheet material of claim 5, wherein the multifunctional monomer is selected from the group consisting of hydroxyethylmethacrylate, hydroxyethylacrylate, hydroxypropyl(meth)acrylate, aminoethyl acrylate, and combinations thereof.

7. The cast sheet material of claim 1, wherein the urethane-urea polymer segment is present in the reaction product from about 10 to about 70 weight percent, by weight of the reaction product.

8. The cast sheet material of claim 7, wherein at least a portion of at least one of the first and second acrylic polymer segments is interlaced, without covalent bonding, with at least a portion of the urethane-urea polymer segment.

9. The cast sheet material of claim 1, further comprising one or more additives selected from the group consisting of adhesion promoters; biocides; anti-fogging agents; anti-static agents; bonding agents; catalysts and initiators; colorants; coupling agents; dispersants; flame retardants and smoke suppressants; lubricants; micas; plasticizers; molecular weight regulators; processing aids; release agents; stabilizers; ultraviolet light absorbers; and combinations thereof.

10. The cast sheet material of claim 1, wherein the reaction product forms in the presence of a catalyst for polyurethane formation, an initiator for acrylic polymerization, or both.

11. The cast sheet material of claim 1, wherein the cast sheet material has a haze of less than about 3% according to ASTM D1003.

12. The cast sheet material of claim 1, wherein the cast sheet material has a Rockwell hardness (M scale) of at least about 35 according to ASTM D785M.

13. A method of making a cast sheet material, the method comprising the steps of:
   (a) forming a reaction mixture by combining components in a reaction vessel, the forming comprising:
      a polyisocyanate compound comprising at least two isocyanate functional groups;
      a polyol;
      a curative comprising at least two amine functional groups;
      an acrylic monomer comprising at least one double bond; and
      a multifunctional monomer comprising a first functional group comprising an active hydrogen and a second functional group comprising at least one double bond;
   (b) casting the reaction mixture into a mold, wherein at least the polyisocyanate compound, the curative, and the acrylic monomer are combined in the reaction vessel to cause the polyisocyanate compound and the curative to be diluted prior to being cast in the mold; and
   (c) reacting the reaction mixture in the mold to form the cast sheet material, wherein the reacting includes the step of heating the reaction mixture to initiate polymerization of the reaction mixture and formation of a reaction product including a first acrylic polymer segment and a second acrylic polymer segment crosslinked by a urethane-urea polymer segment formed from the polyisocyanate compound and the curative.

14. The method of claim 13, wherein at least a portion of the polyisocyanate compound and at least a portion of the polyol are present in the form of pre-reacted urethane prepolymer, and the pre-reacted urethane prepolymer comprises the at least two isocyanate functional groups.

15. The method of claim 13, wherein the step of forming comprises combining the components of the reaction mixture in a single reaction vessel.

16. The method of claim 13, wherein the step of casting comprises pouring the reaction mixture at ambient temperature into the mold.

17. The method of claim 13, wherein the reaction mixture has a gel time of greater than about 10 minutes.

18. The method of claim 13, wherein the cast sheet material is in the form of a monolithic sheet, and wherein the monolithic sheet has a first dimension that is greater than about 0.6 m (2 ft) and a second dimension that is greater than about 0.9 m (3 ft).

19. A cast sheet material comprising a reaction product of components comprising:
   a polyisocyanate compound comprising at least two isocyanate functional groups;
   a curative comprising at least two amine functional groups, wherein the reaction product comprises the curative from 1 to 4 percent by weight of the reaction product;
   an acrylic monomer comprising at least one double bond; and
   a multifunctional monomer comprising a first functional group comprising an active hydrogen and a second functional group comprising at least one double bond, wherein the reaction product is in a form of a copolymer comprising a first acrylic polymer segment and a second acrylic polymer segment crosslinked by a urethane-urea polymer segment.

20. The method of claim 13, wherein the reaction mixture comprises the curative from 1 to 4 percent by weight of the reaction mixture.

* * * * *

UNITED STATES PATENT AND TRADEMARK OFFICE
CERTIFICATE OF CORRECTION

PATENT NO. : 10,934,402 B2
APPLICATION NO. : 15/818898
DATED : March 2, 2021
INVENTOR(S) : Simoneau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this
Seventh Day of February, 2023

Katherine Kelly Vidal
*Director of the United States Patent and Trademark Office*